United States Patent
Erciyes et al.

(10) Patent No.: US 11,503,039 B2
(45) Date of Patent: *Nov. 15, 2022

(54) PERSONAL CLOUD DEVICE FOR DIGITAL MEDIA

(71) Applicant: Monument Labs, Inc., Chicago, IL (US)

(72) Inventors: Fikret Ercan Erciyes, Chicago, IL (US); Semih Hazar, Chicago, IL (US)

(73) Assignee: MONUMENT LABS, INC., Chicago, IL (US)

( * ) Notice: Subject to any disclaimer, the term of this patent is extended or adjusted under 35 U.S.C. 154(b) by 536 days.

This patent is subject to a terminal disclaimer.

(21) Appl. No.: 16/422,809

(22) Filed: May 24, 2019

(65) Prior Publication Data

US 2019/0349386 A1 Nov. 14, 2019

Related U.S. Application Data

(63) Continuation of application No. 15/396,770, filed on Jan. 2, 2017, now Pat. No. 10,305,916.

(51) Int. Cl.
*G06F 3/06* (2006.01)
*H04L 9/40* (2022.01)
(Continued)

(52) U.S. Cl.
CPC .......... *H04L 63/107* (2013.01); *G06F 3/0622* (2013.01); *G06F 3/0643* (2013.01);
(Continued)

(58) Field of Classification Search
CPC . H04L 67/1097; H04L 67/1095; H04L 67/06; H04L 67/22; H04L 63/10; G06F 11/1451; G06F 17/30165; G06F 3/0683
See application file for complete search history.

(56) References Cited

U.S. PATENT DOCUMENTS 8,589,402 B1 * 11/2013 Lampietro .......... G06F 16/5866
 707/741
2009/0276434 A1 * 11/2009 Harris ..................... G06F 21/10
(Continued)

OTHER PUBLICATIONS

Bodor (How to: Automatically backup files to USB Drive on mount, retrieved Oct. 8, 2021 from https://community.spiceworks.com/how_to/34985-automatically-backup-files-to-usb-drive-on-mount) (Year: 2013).*

*Primary Examiner* — Brian F Shaw
(74) *Attorney, Agent, or Firm* — Marshall, Gerstein & Borun LLP

(57) ABSTRACT

A personal cloud device includes a housing, one or more processors disposed within the housing, a local area network interface to communicatively couple the processors to a local area network, at least one of: (i) internal persistent storage disposed within the housing, or (ii) an interface to removably attach the personal cloud device to a persistent storage device, to store a library of digital media files including photo and/or video content, and a memory disposed within the housing. The memory stores identifiers of users authorized to operate the personal cloud device, and instructions that cause the personal cloud device to detect a trigger condition related to a location of a user device associated with one of the authorized users, and, in response to detecting the trigger condition, automatically retrieve digital media files from the user device for storage in the internal persistent storage or the persistent storage device.

15 Claims, 11 Drawing Sheets

(51) Int. Cl.
  *H04L 67/1097*  (2022.01)
  *H04L 67/30*    (2022.01)
  *H04W 4/021*    (2018.01)
  *H04L 51/42*    (2022.01)
  *H04L 12/28*    (2006.01)
  *H04L 67/06*    (2022.01)
  *H04L 67/10*    (2022.01)

(52) U.S. Cl.
  CPC .......... *G06F 3/0647* (2013.01); *H04L 63/083* (2013.01); *H04L 67/1097* (2013.01); *H04L 67/30* (2013.01); *H04W 4/021* (2013.01); *H04L 12/28* (2013.01); *H04L 51/42* (2022.05); *H04L 67/06* (2013.01); *H04L 67/10* (2013.01)

(56) References Cited

U.S. PATENT DOCUMENTS

| | | | | |
|---|---|---|---|---|
| 2010/0180198 | A1* | 7/2010 | Iakobashvili | G06F 40/232 |
| | | | | 715/257 |
| 2015/0052105 | A1* | 2/2015 | Nguyen | G06F 16/178 |
| | | | | 707/626 |
| 2015/0286835 | A1* | 10/2015 | Azoulai | H04W 4/80 |
| | | | | 713/193 |
| 2016/0363976 | A1* | 12/2016 | Gatson | G06F 30/00 |

* cited by examiner

PERSONAL CLOUD DEVICE FOR DIGITAL MEDIA

FIELD OF THE TECHNOLOGY

This disclosure relates generally to storing and managing collections of photographs or videos and, more particularly, to a dedicated electronic device configured to automatically store, backup, categorize, and otherwise process photographs and videos.

BACKGROUND INFORMATION

For many users today, interactive electronic albums of photographs and videos replace traditional book-format albums due to the relatively high cost of printing photographs, low longevity of paper products, and the vast number of digital photographs people tend to take. Some users store their collections of digital photographs on media for portable storage devices such as "memory sticks," which tend to get easily lost and are not conducive to sharing files. A user generally has to select a file stored on a portable storage device, attach the file to a message using a messaging application, specify recipients, and send the message. These operations sometimes are associated with problems of insufficient cross-platform compatibility. On the other hand, several online services offer cloud-based storage of users' photographs, typically in exchange for a subscription fee, but accessing these collections requires an Internet connection. Moreover, some users feel that online solutions inherently offer less privacy and control.

SUMMARY

Generally speaking, the personal cloud device of this disclosure provides intelligent storage and organization functionality for digital media such as photographs and videos. As discussed below, the personal cloud device in some configurations operates as a node in a local area network (LAN) such as a home Wi-Fi™ network, accessible to only a limited number of users for privacy. Depending on the implementation, the personal cloud device can include internal memory for storing digital media or not include any internal storage and instead rely on an interface (e.g., USB) for accessing external storage device(s). The personal cloud device can include processing hardware, such as special-purpose hardware/firmware or a general-purpose processor that executes software instructions, configured to retrieve digital media files and automatically categorize the retrieved digital media files for subsequent access. Categorization of the digital media can proceed according to user-specified rules and/or automatically detected patterns in user behavior, and the categories can include people, places, events, scenery information, camera identity, camera type, etc.

Depending on the implementation, the personal cloud device can implement one or more of the following example features: automatically retrieving new digital media files from a designed mobile device once the mobile device is within the geo-fence (a virtual perimeter specified relative to a certain place, where crossing the virtual perimeter typically triggers a certain action) of the personal cloud device; automatically backing up digital media files stored on a primary storage device (e.g., a memory drive connected via the first USB port of the personal cloud device) to a secondary storage device (e.g., a memory drive connected via the second USB port of the personal cloud device, a network storage drive, a peer personal cloud device), according to a specified schedule or based on specified trigger events; automatically sharing digital media files with recipients who are not the registered users of the personal cloud device, according to user-specified rules such as "email a copy of the photograph to grandma@email.com if the photograph includes a picture of Joe"; analyzing patterns in user behavior to automatically create categories or groupings of files; providing access to several users provisioned as authorized users of the personal cloud device; providing access to the digital media files to other connected devices such as television (TV) sets, personal computers, etc., via wired or wireless communication links.

An example embodiment of these techniques is a personal cloud device that includes a housing, one or more processors disposed within the housing, a local area network interface to communicatively couple the one or more processors to a local area network, at least one of: (i) internal persistent storage disposed within the housing, or (ii) an interface to removably attach the personal cloud device to a persistent storage device, to store a library of digital media files including photo and/or video content, and a memory disposed within the housing. The memory stores identifiers of one or more users authorized to operate the personal cloud device, and instructions that cause the personal cloud device to detect a trigger condition related to a location of a device associated with one of the authorized users, and, in response to detecting the trigger condition, automatically retrieve digital media files from the user device for storage in the internal persistent storage or the persistent storage device.

Another example embodiment of these techniques is a method for storing and managing digital media content. The method includes detecting, by a personal cloud device, a trigger condition for automatically retrieving digital media files from a user device operated by an authorized user, the trigger condition related to a location of the user device. The method further includes receiving, via a first interface of the personal cloud device, one or more digital media files from a user device, the digital media files including photo and/or video content, in response to detecting the trigger condition. Still further, the method includes determining, by the personal cloud device, that a storage device is removably attached to the personal cloud device; and transferring, by the personal cloud device, the received one or more digital media files to the attached storage device, without receiving a user command to initiate the transfer.

DETAILED DESCRIPTION

Figure 1:
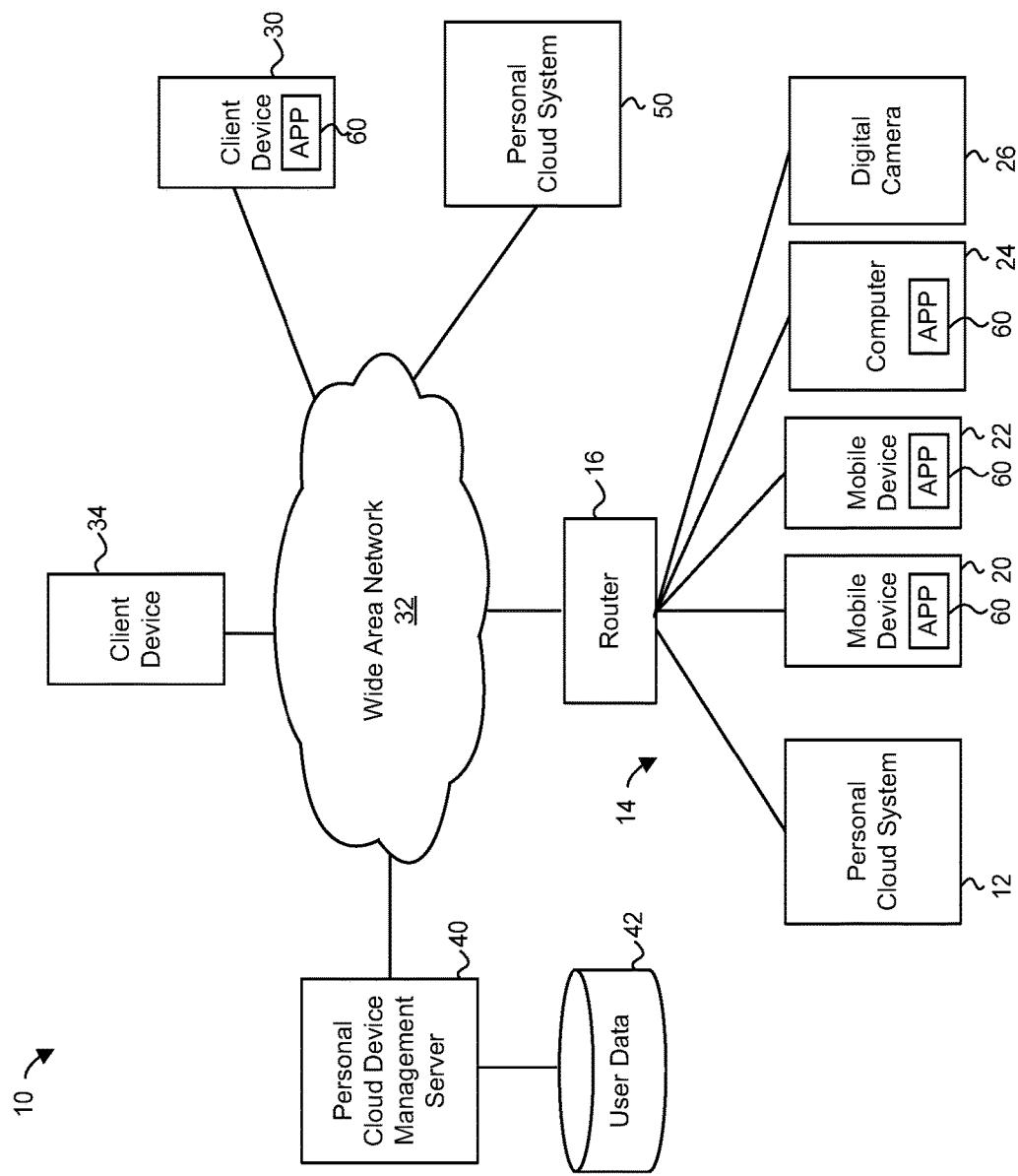
FIG. 1 is a block diagram of an example computing environment in which a personal cloud device and system of this disclosure can operate.

FIG. 1 illustrates an example system 10 in which a personal cloud system 12 provides automatic storage, back up, synchronization, categorization, and other functions related to digital media files such as photographs and videos. As discussed in more detail with reference to FIG. 2, the personal cloud system 12 can include a personal cloud device that implements the system logic and, in some configurations, one or more separate storage devices. The personal cloud system 12 can operate in a local area network 14 such as a home Wi-Fi network. In addition the personal cloud system 12, the network 14 can include a router/access point device 16 and several client devices such as mobile devices 20 and 22, a laptop computer 24, a digital camera 26, a television or a set-top box (not shown to avoid clutter). More generally, the network 14 can include any suitable number of devices operated by one or several users.

In the example configuration of FIG. 1, the personal cloud system 12 is provisioned for use by three members of a family: Abby, Bob, and Carl. Each of these three users can be provisioned with full access rights to all of the digital media files managed by the personal cloud system 12. The personal cloud system 12 can manage access rights based on devices, user identity, or both. In an example scenario, Abby and Bob operate the mobile devices 20 and 22, respectively, and Carl current operates a client device 30. The mobile devices 20 and 22 can be smartphones and the client device 30 can be a desktop computer, for example. Abby and Bob can access the personal cloud system 12 directly via the network 14, while Carl can access the personal cloud system 12 remotely via a wide area network 32, which can be the Internet. The client device 30 in this case need not be provisioned for access to the personal cloud system 12, and instead Carl can provide his credentials to access the personal cloud system 12.

Users who are not provisioned to access the personal cloud system 12 in some cases also can have rights to access individual files, folders, or albums (collectively, "the library") managed by the personal cloud system 12. For example, user Abby can share a certain picture with user David operating client device 34. To this end, a personal cloud device management server 40 can generate a link to the specified picture in response to a request from Abby. The server 40 in the example configuration of FIG. 1 is coupled to a user database 42 where Abby, Bob and Carl register their personal cloud system 12. Example sharing techniques are discussed in more detail below.

The personal cloud system 12 can deny access to some of the devices operating in the network 14. For example, a guest of the family can have access to the WAN 32 via the router 16 without having access to the personal cloud system 12.

FIG. 1 further depicts a peer personal cloud system 50 with which the personal cloud system 12 can interact. For example, user Carl can set up the personal system device 50 at his office and configure the personal cloud systems 12 and 15 for synchronization. In another example scenario, user Emily sets up the personal system device 50 in her home network, and together with users Abby, Bob, and Carl configures the systems 12 and 15 to automatically synchronize content. As discussed in more detail below, users of the systems 12 and 15 alternatively can define rules for selectively sharing digital media files, e.g., "if photograph includes Abby, automatically transmit a copy to Emily's device."

In some cases, the users can provision the personal cloud system 12 to back up a portion or the entirety of the library to a cloud-based repository. For example, the personal cloud system 12 can invoke appropriate application programming interface (API) functions exposed by a provider of a cloud-based repository for automatic access. The personal cloud system 12 can access the cloud-based repository via the network 32.

With continued reference to FIG. 1, an instance of a software application 60 can run on the devices 20, 22, 24 and 60 to allow interaction with the various features of the personal cloud system 12. The software application 60 can be a general-purpose application such as a web browser or a special-purpose application developed specifically for interaction with the personal cloud system 12. The software application 60 can provide such functions as provisioning users of the personal cloud system 12, setting up rules for back-up and synchronization of data, configuring rules for sharing digital media files, creating geo-fences or other trigger conditions for synchronizing storage devices, etc.

Figure 2:
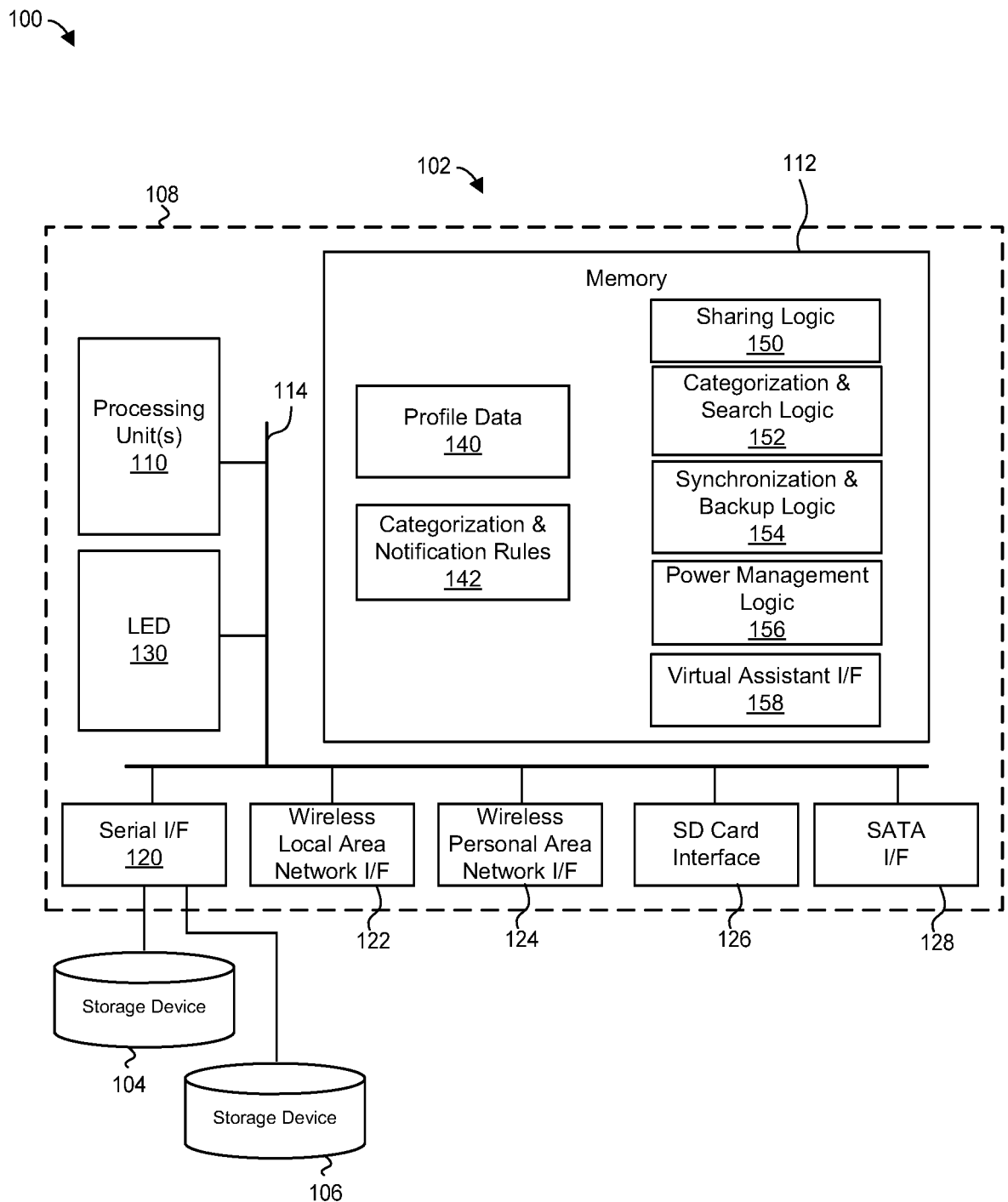
FIG. 2 is a block diagram of a personal cloud system that can operate in the system of FIG. 1.

Next, FIG. 2 depicts a block diagram of an example personal cloud system 100, which can operate in the system of FIG. 1 as the personal cloud system 12 and/or 50. The personal cloud system 100 includes a personal cloud device 102 and, depending on the implementation, external storage devices. In the example implementation depicted in FIG. 2, the personal cloud device 102 is removably connected to storage devices 104 and 106. More particularly, the personal cloud device 102 includes a housing 108 enclosing various components discussed below, and each of the storage devices 104 and 106 includes a respective separate housing.

The personal cloud device 102 includes one or more processing units 110 and a memory readable by the one or more processing units 110, in this example implementation. The one or more processing units 110 can include a general-purpose central processing unit (CPU), a graphics processing unit (GPU), and/or any other suitable processor. The memory 112 can include persistent (e.g., a hard disk, flash memory) and non-persistent components (e.g. RAM) to store instructions and data. In other implementations, the processing hardware of the personal cloud device 102 can include special-purpose hardware implemented using a field-programmable gate array (FPGA), for example. More generally, the personal cloud device 102 can include any suitable combination of hardware, firmware, and software.

The one or more processing units 110 and the memory 112 can be interconnected via a digital bus 114. Other components interconnected via the digital bus 114 can include various wired and wireless interfaces. In the example of FIG. 2, the personal cloud device 120 includes a serial interface 120 such as Universal Serial Bus (USB) with multiple ports; a WLAN interface 122 that can support the Wi-Fi standard, for example; a WPAN interface 124 that can support the Bluetooth™ standard, for example; an Secure Digital (SD) card interface 126 to receive an SD card; and a Serial Advanced Technology Attachment (SATA) interface 128. In other implementations, the personal cloud device 120 can include additional interfaces such as Infrared Data Association (IrDA) interface or an Ethernet interface, and/or can be lacking some of the interfaces depicted in the example configuration of FIG. 2.

Further, the personal cloud device 102 can include a Light Emitting Diode (LED) 130 to signal the operational status of the personal cloud device 120. For example, the color and/or the illumination pattern of the LED 130 can indicate whether the personal cloud device 120 is in a stand-by mode, is currently writing data to a storage device, has detected a low-memory condition or some other condition. To interact with the personal cloud device 102 more fully, a user can also access various interactive functions of the personal cloud device 102 using a web browser or a special-purpose application (see FIG. 1) via one of the interfaces.

The personal cloud device 102 also can be coupled to an external output device such as a television or a virtual reality (VR) set via one of the interfaces 120-128. For example, the user can operate his or her mobile device to direct the personal cloud device 102 to display the digital media files via the television, the VR set, or another suitable device in the specified manner.

The example personal cloud device 102 does not include a region in the memory 112 dedicated to persistent storage of digital media. The personal cloud device 102 can be configured to hold only a limited amount of data in RAM during processing, and store the library of photographs and videos only on the external storage devices 104 and 106. In other implementations, however, a portion of the memory 112, or a separate memory component within the housing 108, is configured to operate as persistent storage of digital media files. For example, the personal cloud device 102 can include an Internal Solid State (ISS) or a magnetic drive.

The storage devices 104 and 106 can be flash-based or magnetic-based storage units with USB, SATA, or similar interfaces. As a more specific example, these storage units can be USB flash "memory sticks." When more than one external storage device is coupled to the personal cloud device 108, the user can configure one or several of the storage devices to operate as primary storage, and another one or several of the storage devices to operate as secondary or backup storage.

In the example implementation depicted in FIG. 2, the memory 112 can store software instructions that implement sharing logic component 150, categorization and search logic 152, synchronization and backup logic 154, power management logic 156, and a virtual assistant interface 158. The memory 112 also can store certain data such as profile data 140 and categorization and notification rules 142.

In operation, the sharing logic 150 determines when a certain digital media file or a group of files should be shared with another personal cloud system, an email account, a cloud-based repository, etc. The sharing logic 150 can operate according to user-specified rules that specify targets for sharing files (people, devices, etc.), the conditions under which the files should be shared ("if both Abby and Bob are present in the picture"), the frequency of executing the rule (e.g., daily, weekly), etc. Example operation of the sharing logic 150 is discussed in more detail below with reference to FIGS. 6 and 7.

The categorization and search logic 152 creates attributes for digital media files to indicate to which categories these digital media files belong. In addition to user-defined categories, e.g., "spring break," the categorization and search logic 152 can automatically identify and propose categories such as "kids" or "summer of 2016." In some cases, the categorization and search logic 152 proposes categories with spatial, temporal, and personal attributes such as "trip to Milpitas the weekend of May 6-8, 2016 with Maria." The categorization and search logic 152 can inspect both the metadata in a digital image and the people/objects depicted in the digital image. Moreover, the categorization and search logic 152 can implement machine-learning techniques to identify patterns in user's behavior and propose categorization in accordance with the identified patterns. Example operation of this component is discussed in more detail below with reference to FIGS. 8 and 9.

The synchronization and backup logic 154 can automatically synchronize the library managed by the personal cloud device 102 with another personal cloud device or some other repository in accordance with user-specified rules, and automatically create backup copies of some or all of the digital media files. As discussed in more detail below with reference to FIGS. 3-5, the synchronization and backup logic 154 can operate on the level of a single personal cloud system (e.g., transfer files between the storage devices 104 and 106), a local-area network (e.g., transfer files between a mobile device and a personal cloud system owned by the same family, or a wide-area network (e.g., backup selected albums to a cloud-based repository).

Further, the power management logic 156 can reduce the amount of power consumed by the personal cloud system 100 in view of which of the storage devices 104, 106, etc. is designated as the primary storage device. Moreover, the power management logic 156 in some implementations detects relevant patterns in user behavior and schedules power-on and power-down periods in accordance with when the user is likely to request access to the personal cloud system 100 or a particular storage device. Example operation of the power management logic 156 is discussed in more detail below with reference to FIG. 8.

Generally speaking, a virtual assistant such as Amazon Echo or Google Home, for example, can assist with accessing and navigating the library managed by the personal cloud device 102. The virtual assistant interface 158 can invoke appropriate APIs to connect to a virtual assistant via the WLAN interface 122 or the WPAN interface 124, for example, and maintain a connection between the personal cloud device 102 and virtual assistant. The virtual assistant can queue user commands directed at the personal cloud device 102, and the personal cloud device 102 can periodically fetch these commands from the virtual assistant. A user in example scenario issues voice commands to the virtual assistant for accessing photographs and videos from the personal cloud device 102 and streaming these photographs and videos to his or her virtual reality headset.

Referring still to FIG. 2, the profile data 140 can include provisioning data for the personal cloud device 102, which initially can include a list of authorized users, authentication information (e.g., login and encoded password), and initial preferences. As discussed in this disclosure, the personal cloud device 102 also can automatically detect various preferences and patterns in user behavior, and accordingly can augment the initially received provisioning data with additional information. For example, after Bob has been using the personal cloud device 100 for some time, the personal cloud device 102 can store an indication that Bob tends to mark pictures of cars as favorites, that Bob views albums on average once a week, that Bob tends to share pictures of Carl with Abby, etc. The personal cloud device 102 can determine and store this data for individual users as well as for groups of users, such as the family of Abby, Bob and Carl.

In some implementations, the personal cloud device 102 can pair unique identifiers of SD cards received via the SD card interface 126 with users. The profile data 140 thus can store respective SD card identifiers for each of users Abby, Bob and Carl and apply this association when importing new files. When Abby inserts her SD card, for example, the personal cloud device 102 can automatically transfer the digital media files from her SD card specifically to Abby's folder or album (of course, the personal cloud device 102 also can apply additional categorization principles and user-specified rules).

The memory 112 also can store categorization and notification rules 142, which users Abby, Bob and Carl can set up using the application 60, for example (see FIG. 1). These rules can specify which digital media files should be shared with other users, when these files should be shared, the manner in which these files should be shared (e.g., email, transfer to a cloud-based repository, transfer to a peer personal cloud system). Some of the categorization and notification rules 142 can be generated automatically and added to the set 142 upon user approval.

It is noted that the software modules 150-156 and data 140-142 illustrate an example implementation, and that in other implementations the personal cloud device 102 can include additional modules or, conversely, fewer modules than depicted in FIG. 2. In general, the personal cloud device 102 can include any suitable number of software modules to implement various functions.

Referring back to FIG. 1, some of the functions discussed with reference to the personal cloud device 102 of FIG. 2 also can be partially or fully implemented in the personal cloud device management server 40. For example, the server 40 can implement a more robust and computationally intensive categorization logic than the personal cloud system 12 or 50 can support, or the server 40 can use signals unavailable at any single personal cloud system 12 or 50. For example, the server 40 can train a categorization model using signals indicative of user behavior received from multiple unrelated personal cloud systems.

For further clarity, several example methods are discussed next with reference to FIGS. 3-11. Each of these methods can be implemented as a set of instructions that can be stored on non-transitory computer-readable medium and executable by one or more processors. As indicated above, some or all of these methods can be implemented in the software components 150-156 discussed above. Further, at least some of these methods can be distributed among client-side (a personal cloud device) and server-side (a personal cloud device management server) components. For convenience, these methods are discussed below with example reference to the personal cloud device 102 and/or the personal cloud device management server 40.

Figure 3:
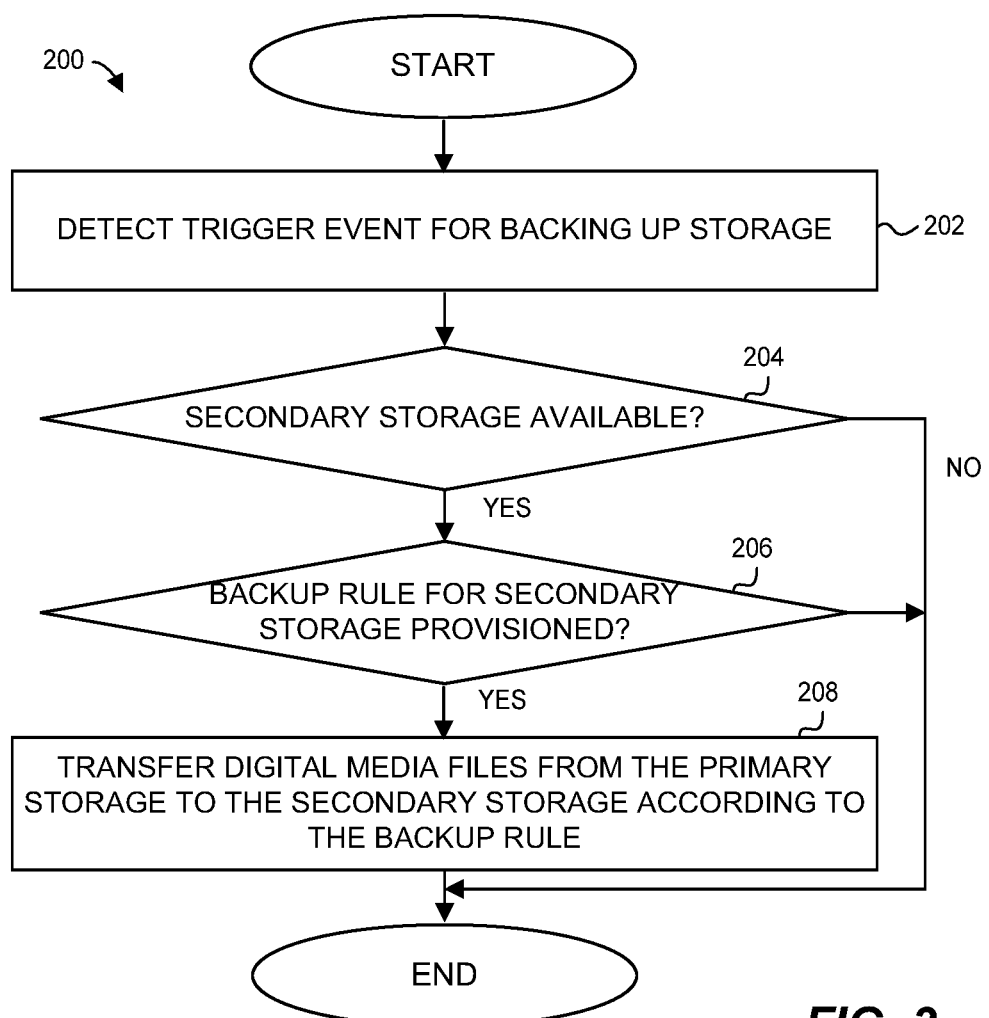
FIG. 3 is a flow diagram of an example method for automatically backing up digital media files to a secondary storage device, which can be implemented in the personal cloud device of FIG. 2.

FIG. 3 is a flow diagram of an example method 200 for automatically backing up digital media files to a secondary storage device. This method begins at block 202, where a trigger event that potentially can trigger automatic back up is received. For example, a user can specify a rule according to which the expiration of a periodic timer (e.g., 24 hours, 72 hours, 7 days) causes the personal cloud device 102 to check whether a backup is required and feasible. However, the trigger event need not be driven by a user-specified rule. As another example, the personal cloud device 102 can determine that, after being disconnected from a WAN, the personal cloud device 102 now can access the Internet, and that new digital media files have become available since the last backup. As yet another example, the personal cloud device 102 can trigger on a certain difference in the number of backed-up files (e.g., 10) regardless of how much time elapsed since the last backup.

Further, the coupling of a new storage device to the personal cloud device 102 can serve as a trigger as well. The personal cloud device 102 can notify the user via the application 60 that a new storage device is now available and ask whether the user wants to use the new storage device as his or her primary storage, secondary (backup) storage, or whether the user wants to import digital media files from the new storage device to the primary, previously provisioned, storage device.

At block 204, the personal cloud device 102 checks whether secondary storage is provisioned for backup. The secondary storage can be a storage device directly coupled to the personal cloud device 102 via a USB port or a near-range wireless interface, a network-attached storage (NAS) device operating as a node in the home network, a remote device such as another personal cloud system, or a cloud-based repository accessible via the Internet.

If the secondary storage is properly configured, the flow proceeds to block 206, where the backup rule for the secondary storage is checked. As indicated above, the users can set up a rule that designates one or several secondary storage locations, the frequency of backup, the limitations of backing up the library (e.g., "back up every digital media file that includes Carl; do not back up digital media files that include only Abby"), other conditions (e.g., "back up when the library includes more than 100 photographs," "back up when the primary storage is 85% full"), etc. The user also can set up a rule to back up some or all of the files to multiple secondary storage targets. If no backup rule is available, the method completes.

Otherwise, at block 208, one or multiple digital media files are transferred from the primary storage to the designated secondary storage, in accordance with the rule. The personal cloud device 102 can encrypt digital media files when transferring to an online cloud-based repository, to ensure privacy.

Similar to backup, synchronization between several independent storage systems or other devices can proceed according to user-specified rules, in at least some of the scenarios. Generally speaking, synchronization can include transfer files in both directions, i.e., into the personal cloud device and out of the personal cloud device. Example synchronization methods are discussed next with reference to FIGS. 4 and 5. In particular, FIG. 4 is a flow diagram of an example method 250 for automatically synchronizing a personal cloud device with a peer personal cloud device or another digital media repository according to user-specified rules, and FIG. 5 is a flow diagram of an example method 300 for automatically synchronizing a digital media storage with a portable device detected within a geo-fence or otherwise within a user-specified boundary.

Similar to backup rules, synchronization rules can specify the schedule of synchronization (e.g., once every 24 hours, once every 7 days), the targets of synchronization (e.g., "this personal cloud device and the remotely disposed personal cloud device of user Carl" or "this personal cloud device each of Abby's, Bob's and Carl's smartphone" along with various conditions such as "whenever Bob's smartphone camps on the home Wi-Fi network" or "whenever the mobile device is within a 3-foot geo-fence of the personal cloud device."

Figure 4:
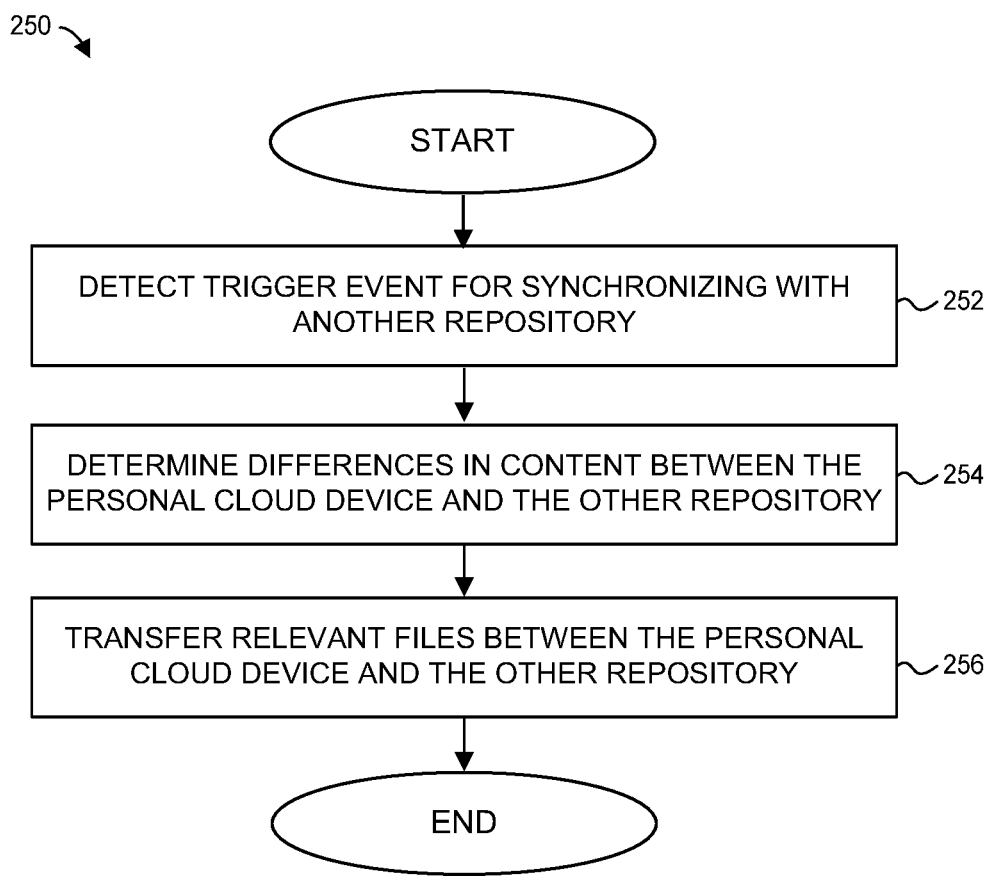
FIG. 4 is a flow diagram of an example method for automatically synchronizing a personal cloud device with a peer personal cloud device or another digital media repository according to user-specified rules, which can be implemented in the system of FIG. 1.

Referring first to FIG. 4, the methods 250 begins at block 252, when a trigger event is received. Next, at block 254, the differences in content between the personal cloud device and another repository are ascertained. For example, Bob's smartphone can include several photographs absent from the family personal cloud system, and these photographs can be identified at block 254 based on unique identifiers assigned to the photographs by respective cameras and/or the personal cloud system, or based on pixel-by-pixel comparison between photographs. At block 256, the relevant digital media files are transferred between the personal cloud system and the other repository. The transfer at block 256 can be inbound relative to the personal cloud device, outbound, or both.

Figure 5:
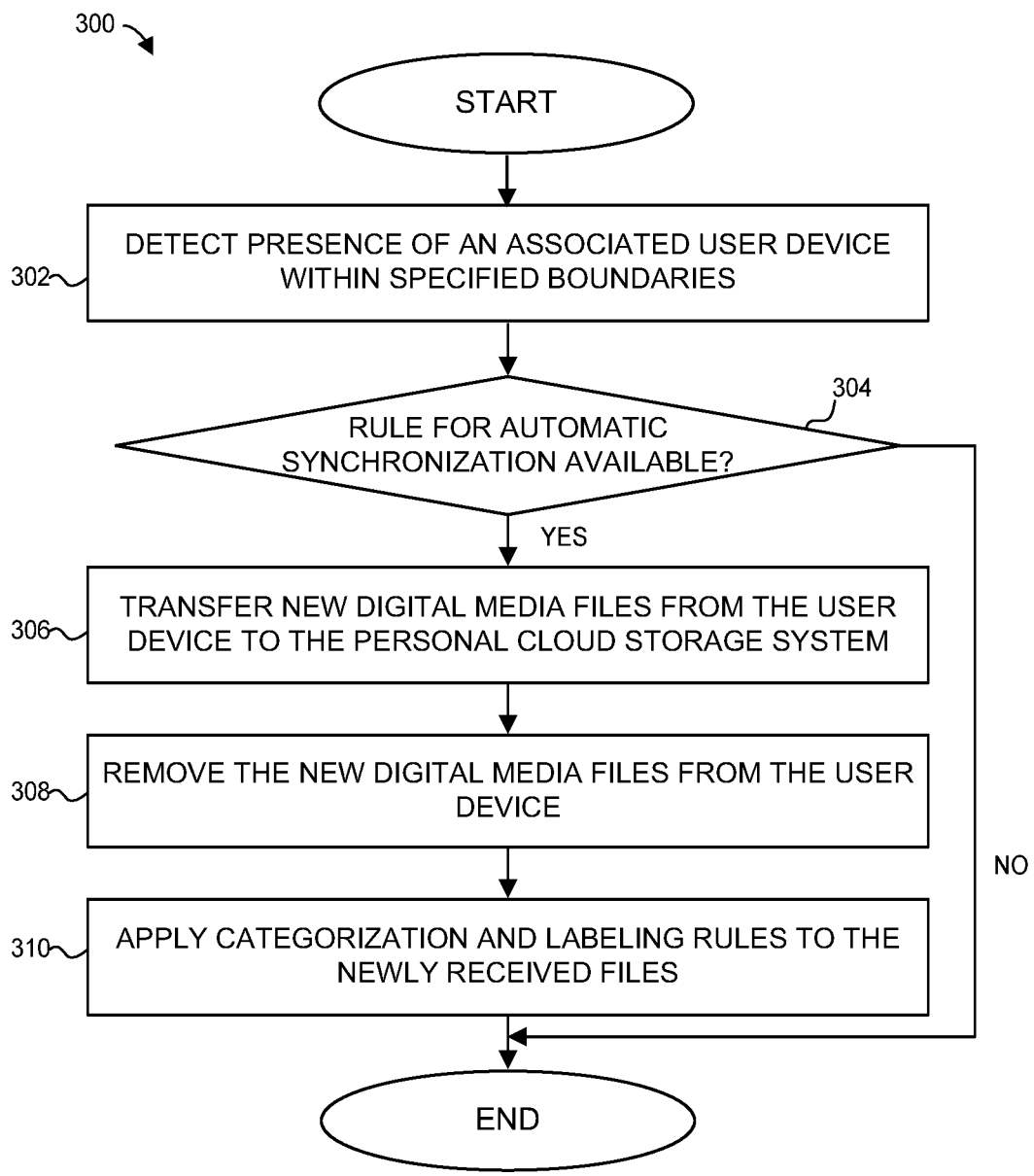
FIG. 5 is a flow diagram of an example method for automatically synchronizing a digital media storage with a portable device detected within a geo-fence or otherwise within a user-specified boundary, which can be implemented in the system of FIG. 1.

FIG. 5 is a flow diagram of an example method 300 for automatically synchronizing a digital media storage with a portable device detected within a geo-fence or otherwise within a user-specified boundary. In this case, presence of a user device associated (provisioned) with the personal cloud system is detected within geo-fence, which can be defined in terms of the distance from the personal cloud system when precise positioning is available, based on proximity sensing (using Bluetooth beacons, for example), or simply based on the user device joining the wireless LAN (or other network) in which the personal cloud device operates.

Next, at block 304, the one or more rules for automatic synchronization are analyzed, when available, to determine the conditions for transferring digital media files. When a rule is unavailable, the method completes. Otherwise, the flow continues to block 306, where new digital media files are transferred from the user device to the personal cloud storage system, according to this example scenario. The files can be transferred first to the personal cloud device 102 and then to the storage device 102 or 104, for example. At block 308, the files are removed from the user device to free up storage. The personal cloud device 102 then generate a notification message via the corresponding application (e.g., application 60) executing on the user device. Thus, user Abby can come home, and the personal cloud device 102 can automatically move the new photographs from her smartphone to a storage device, so that Abby need not worry about running out of memory for new photographs on her smartphone, and notify Abby when the transfer has been completed.

At block 310, categorization and labeling rules can be applied to the newly received files, as discussed in more detail below. In another implementation or scenario, categorization and labeling are executed as a batch job when the personal cloud device 102 is not engaged in storing, searching, or other functions. In this manner, users do not experience delays when interacting with the personal cloud device 102.

Figure 6:
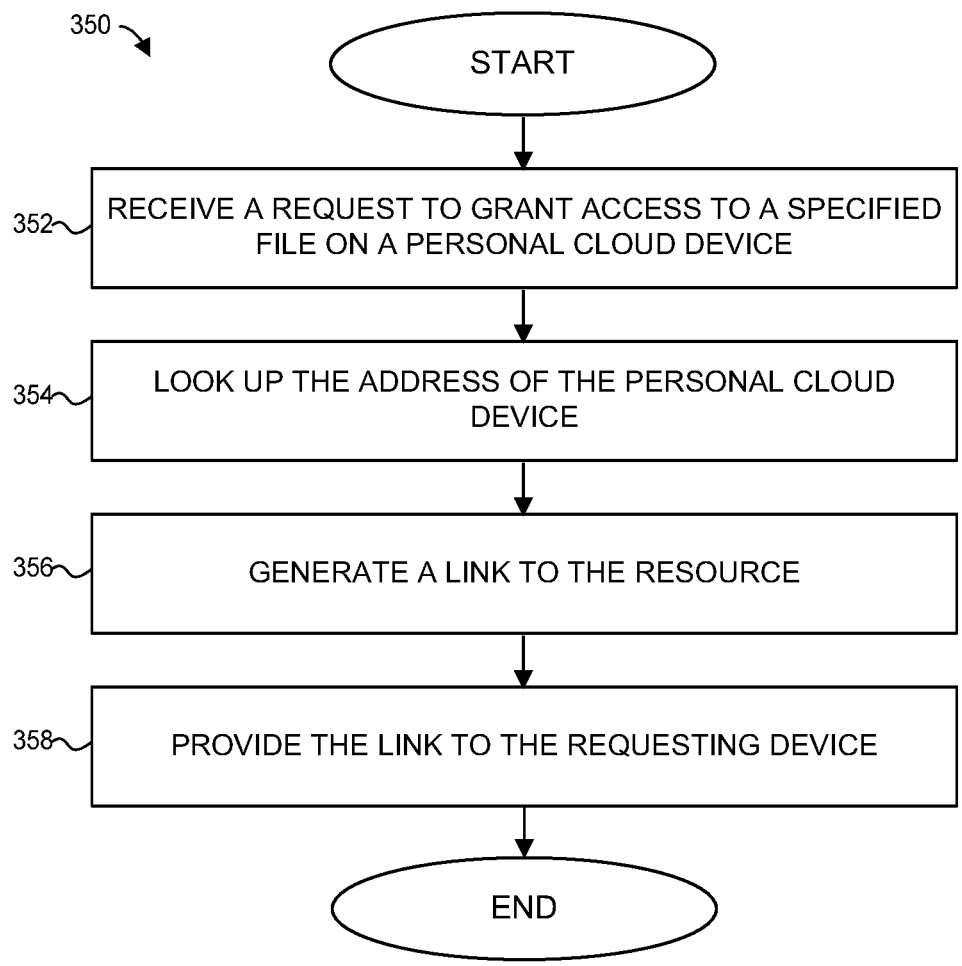
FIG. 6 is a flow diagram of an example method for sharing a specified file stored on a personal cloud device of FIG. 1 with a device unassociated with the personal cloud device, which can be implemented in the system of FIG. 1.

FIG. 6 is a flow diagram of an example method 350 for sharing a specified file stored by the personal cloud device 102 with a device or account unassociated with the personal cloud device. To continue with the example mentioned above and referring back to FIG. 2, user Abby may wish to share a certain photograph stored on one of the storage devices coupled to the personal cloud device 102 with user David, who is not provisioned as one of the users of the personal cloud device 102 (and who, unlike user Emily, does not operate a peer personal cloud device with which the personal cloud device 102 is synchronized). Referring back to FIG. 1, user Abby in this case can operate the application 60 on her mobile device 20 to select a photograph, identify David by specifying his email address, for example, and direct the personal cloud system 12 to grant David access to the selected photograph. Depending on the implementation, the personal cloud system 12 can generate a message and transfer a copy of the selected photograph to David, or the personal cloud device management server 40 can generate a link to the selected photograph in the personal cloud system 12 using WebRTC mechanisms, for example.

Referring to FIG. 6, the example method 350 begins at block 352, where a request to grant access to a specified file on a personal cloud device is received from a user authorized to access the personal cloud device. At block 354, the address of the personal cloud device is obtained. For example, the personal could device management server 40 can look up the IP address of the personal cloud system with which the user is associated, operating similar to a DNS server. The server 40 then can generate and append to the IP address a unique identifier of the specified file, at block 356. The unique identifier can be a temporary identifier such as an alphanumeric string that appears random. At block 358, the resulting link can be provided to the requesting user or, in some implementations, to the user with whom the specified is being shared.

Figure 7:
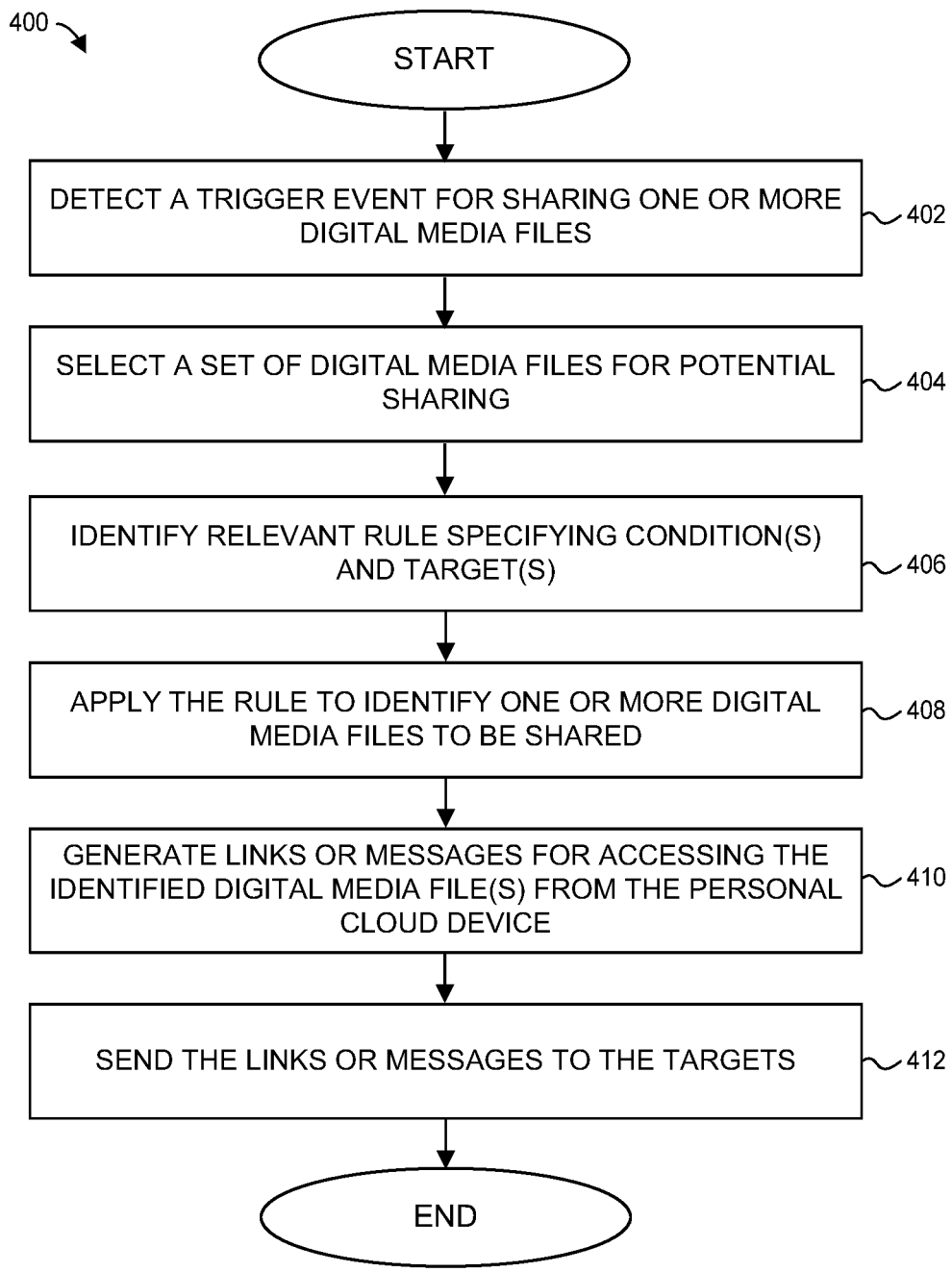
FIG. 7 is a flow diagram of an example method for automatically sharing one or more files stored on a personal cloud device of FIG. 1 with other users according to user-specified rules, which can be implemented in the system of FIG. 1.

In some cases, users may wish to share certain files automatically, without manual selection of individual files. FIG. 7 a flow diagram of an example method 400 for automatically sharing one or more files stored on a personal cloud device of FIG. 1 with other users according to user-specified rules.

The method 400 begins at block 402, where a trigger event for sharing one or more digital media files is detected. Generally similar to the examples discussed above with reference to FIGS. 3 and 4, the trigger event can correspond to timer expiration, an indication that new digital photographs or videos have been received by the personal cloud device 102, an explicit user command, etc.

At block 404, a set of digital media files is selected for potential sharing. For example, when the new user couples a new storage device with a set of photographs to a personal cloud device already connected to a primary storage device, the method 400 can operate only on the digital media files on the new storage device (because the files stored on the primary storage device presumably were considered for potential sharing earlier).

Next, at block 406, relevant rules specifying conditions and targets for potential sharing are retrieved. A rule in general can have multiple conditions with corresponding parameters, and at least one action. For the example family considered above, a certain rule can specify that that if a photograph depicts Carl, the photograph is to be shared with Emily. A more complex rule can specify that if a photograph depicts Abby and Bob and if the photograph was captured with Abby's camera, the photograph is to be shared with the people on a certain list. In general, the conditions can relate to people, places, or objects depicted in the images, time the image was captured, the location at which the image was captured, the device with which the image was captured, and other identifiable attributes. The corresponding parameters accordingly can include dates, names of people, geographic coordinates or names or places, etc. The action specified by the rule can correspond to emailing, sending with a text message, granting access via a link as discussed above, transferring to a peer personal cloud device, etc. Parameters for these actions can correspond to email addresses, telephone numbers, or addresses of personal cloud devices, for example.

In any case, the identified rule is applied to the one or more digital media files at block 408, the corresponding links or suitable messages are generated at block 410, and these links or messages are transmitted to the corresponding targets at block 412.

In a generally similar manner, users can set up rules for automatically printing photographs using local or remote print services. For example, a rule can specify that when a photograph includes each of the users Abby, Bob and Carl, the picture should be submitted for remote printing at the specified convenience store, via the available web interface of by emailing the pictures to a certain email address.

Figure 8:
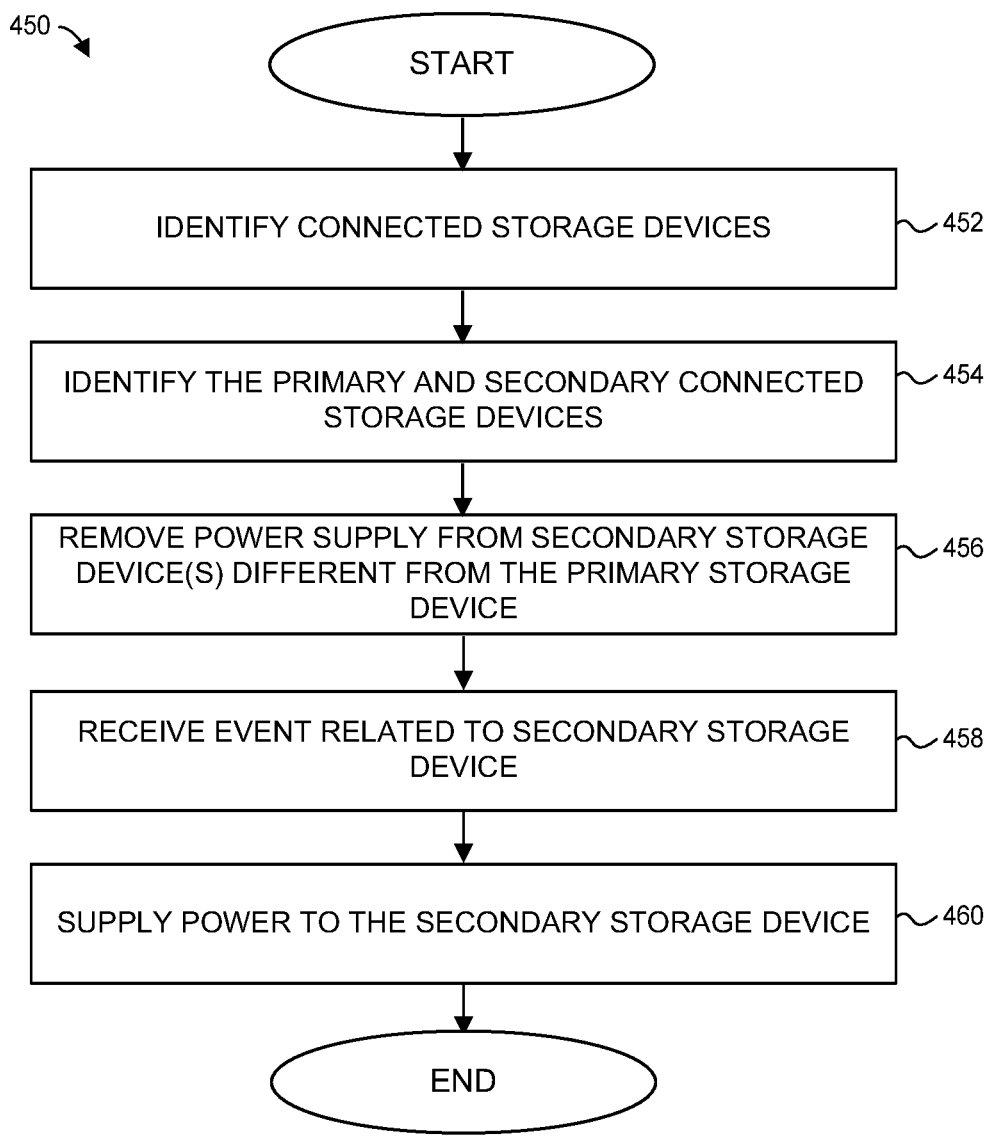
FIG. 8 is a flow diagram of an example method for managing power consumption, which can be implemented in the personal cloud device of FIG. 2.

Next, an example method 450 for managing power consumption is considered with reference to FIG. 8. Referring back to FIG. 2, the personal cloud device 102 can supply power to the storage devices 104 and 106 via the serial interface 120. To reduce power consumption, the personal cloud device 102 can discontinue power supply to the storage device being used as a backup storage device when this storage is not in active use. For example, if the storage device 104 is designated as the primary storage device, and if the storage device 106 is designated as the secondary storage device, the personal cloud device 102 can supply power to the storage device 106 only during backup operations. Further, the personal cloud device 102 can detect patterns in user behavior and schedule operations related to the secondary storage device 106 accordingly. Still further, in some implementations, the personal cloud device 102 can use the detected patterns to reduce power consumption by the primary storage device 104. For example, if the user does not use the personal cloud device 102 at certain hours in the night, the personal cloud device 102 can reduce or eliminate power supply to the primary storage device 104 at this time.

As illustrated in FIG. 8, the method begins with identifying connected storage devices at block 452. Next, the primary and secondary connected storage devices are identified at block 454. At block 456, power supply is removed from the secondary storage device. After an event related to the secondary storage device, such an indication that files are about to be copied to the secondary storage device, is received at block 458, power is supplied again to the secondary storage device at block 460.

Figure 9:
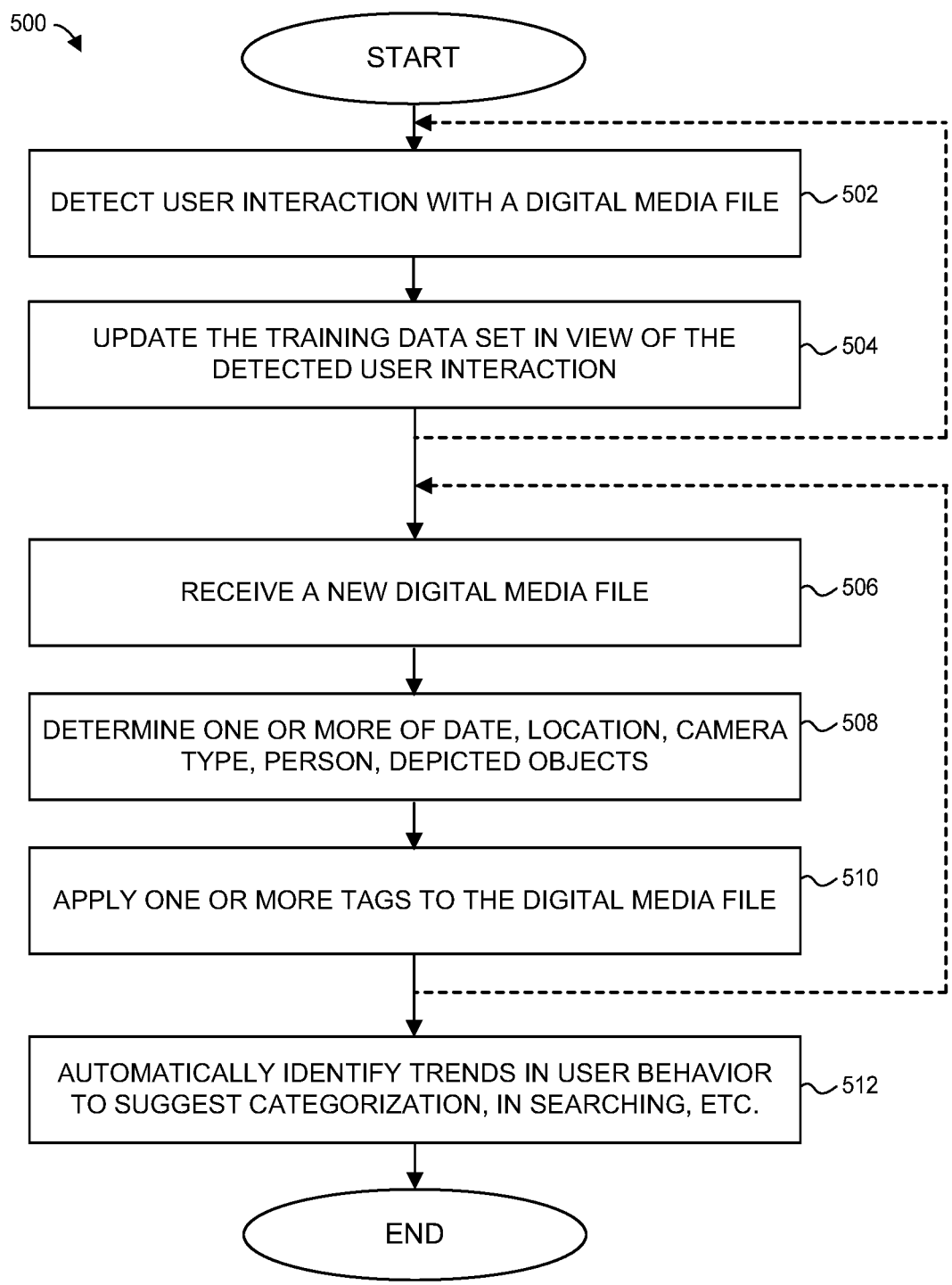
FIG. 9 is a flow diagram of an example method for automatically categorizing digital media files which can be implemented in the personal cloud device of FIG. 2.

Now referring to FIG. 9, an example method 500 can be executed as part of a process of automatically categorizing digital media files to facilitate subsequent browsing and searching. At block 502, user interaction with a digital media file stored in the personal cloud system is detected. For example, user Abby may select a photograph depicting Bob and Carl on a beach, mark the photograph as a favorite, and share the photograph with Emily. Other examples of signals that can be processes at block 502 include the frequency of viewing a certain photograph or video, the duration of inspection of a photograph, inclusion of the photograph in multiple albums, etc.

The photograph with which the user interacts at block 502 can include various attributes related to time, location, content, etc. Some of the attributes can be derived from metadata. For example, a digital camera can record the geographic location at which the photograph was captured along with a time stamp. The personal cloud device 102 also can implement suitable facial recognition techniques, including those known in the art, to "tag" users depicted in the photographs. Moreover, the personal cloud device 102 can utilize image-processing techniques to detect objects within the photograph and tag the photographs accordingly. The personal cloud device 102 also can synthesize attribute based on time stamps, e.g., "summer" or "weekend." As discussed below, the personal cloud device 102 in some cases can infer attributes by determining that a photograph shares certain attributes with another photograph received from another device, another user, etc. Thus, a certain photograph can include, in addition to the geographic and time information, an indication of several people depicted in the picture, an indication of recognized objects (e.g., "plate of food" and "forest"), and other attributes.

When a user interacts with the photograph that has one or more attributes, a training data set is updated accordingly at block 504. For example, various counters indicating how the user responded to the photograph, and what attributes the photographs include, can be incremented. Deep learning or another suitable type of machine learning techniques can be used to process user input received at block 502. Blocks 502 and 504 can be executed any number of times; generally speaking, the overall quality of categorization improves with larger training sets. It is noted that rather than developing a common model for all users, the method 500 allows a personal cloud system to develop a user-specific and/or family-specific model.

At block 506, a new digital media file is received. The new digital media file can be a photograph or a video, for example, and in some cases can include metadata. Additional attributes related to place, time, devices, people, etc. are determined at block 508. The corresponding tags are applied to the digital media file at block 510. Similar to blocks 502 and 504, blocks 506-510 can be executed any number of times.

In an example scenario, the family of Abby, Bob and Carl go on a picnic over the weekend. The personal cloud device 102 retrieves photographs from one or several of their cameras and analyzes the metadata and the content of the photographs. The personal cloud device 102 applies image-processing techniques to analyze and score scenery information relative to other signals, and generates the term "picnic" as a suggested tag for the set of photographs. Using the date/time information in the metadata along with a calendar, the personal cloud device 102 generates the term "weekend" as another suggested tag for the same set. Using the geographic information in the metadata, the personal cloud device 102 generates the term "Milpitas" as yet another suggested tag for the set. Finally, the personal cloud device 102 can apply facial recognition functions to the set of photographs to identify a tagged user, Maria (whom user Abby, for example, previously manually identified in an earlier photograph stored by the personal cloud device 102). Thus, the personal cloud device 102 can suggest tags "picnic," "weekend," "Milpitas," and "Maria" for the new set of photographs. The tags in some implementations can be additionally organized into a longer compound tag using a suitable template <when><what><where><with whom> to generate "Weekend picnic at Milpitas with Maria."

At block 512, and when the data set is sufficiently large, the results of machine-learning can be applied for various purposes. In some cases, categories can be suggested based on the automatically identified trends in user behavior. For example, the personal cloud device 102 can determine that user Bob tends to like videos and photographs of forests, and accordingly suggests to Bob that he create an album dedicated to this topic. Further, the personal cloud device 102 can assign a higher score to digital media files tagged with information related to the topic of forests or, more broadly, to the outdoors. These digital media files accordingly have higher probability of being relevant when Bob searches through this album, or when the personal cloud device 102 highlights certain photographs for other reasons. As indicated above, digital media files generally can be grouped based on location, time, scenery, camera used to capture the imagery, people depicted in the photographs, etc.

Figure 10:
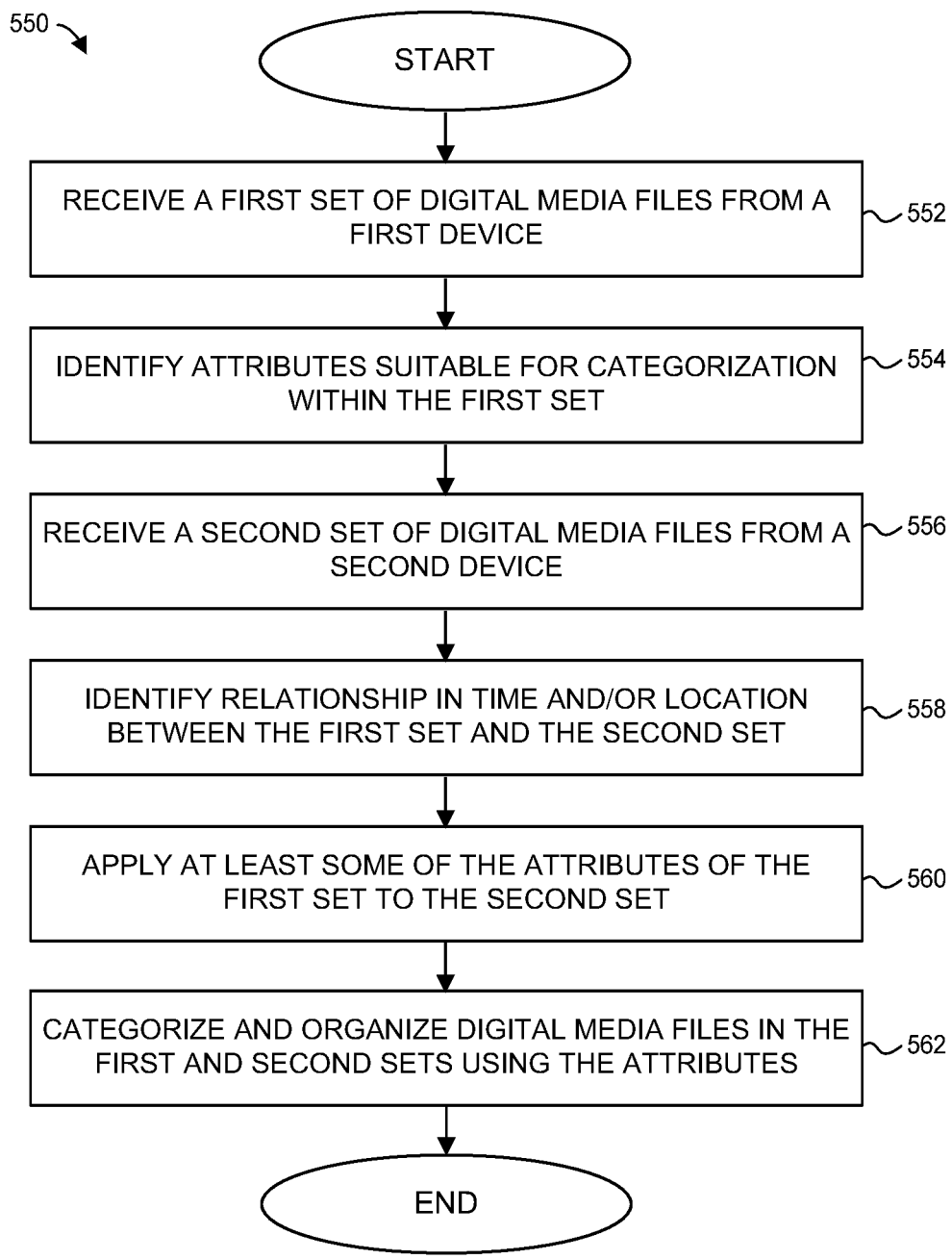
FIG. 10 is a flow diagram of an example method for automatically categorizing digital media files in a set using attributes detected in another set, submitted by another user of the personal cloud device, which can be implemented in the personal cloud device of FIG. 2.

FIG. 10 is a flow diagram of an example method 550 for automatically categorizing digital media files in a set using attributes detected in another set, submitted by another user of the personal cloud device. To consider again the example scenario of a family picnic, Abby's camera may be equipped with a Global Positioning Service (GPS) component, whereas Bob's camera may lack positioning functionality. Both Abby and Bob take photographs, and many of these tend to depict the same people and objects. Moreover, the time stamps in Abby's and Bob's photographs often are similar. Using these similarities, the personal cloud device 102 can infer that some of the attributes derivable from the more robust metadata generated by Abby's camera also are applicable to the photographs retrieved from Bob's camera.

In particular, the method 500 begins at block 552, where a first set of digital media files is received from a first device. Attributes suitable for categorization are identified within the first set of digital media files at block 554. Next, a second set of digital media files is received from a second device at block 556. Common relationship is identified and evaluated (e.g., by generated a numerical probability score) for the first and second sets (block 558). To this end, time, location, faces, etc. can be considered. Some or all of the attributes from the first set are applied to the second set at block 560. At block 562, the first and the second sets are categorized and organized using the attributes derived at blocks 552-560.

Figure 11:
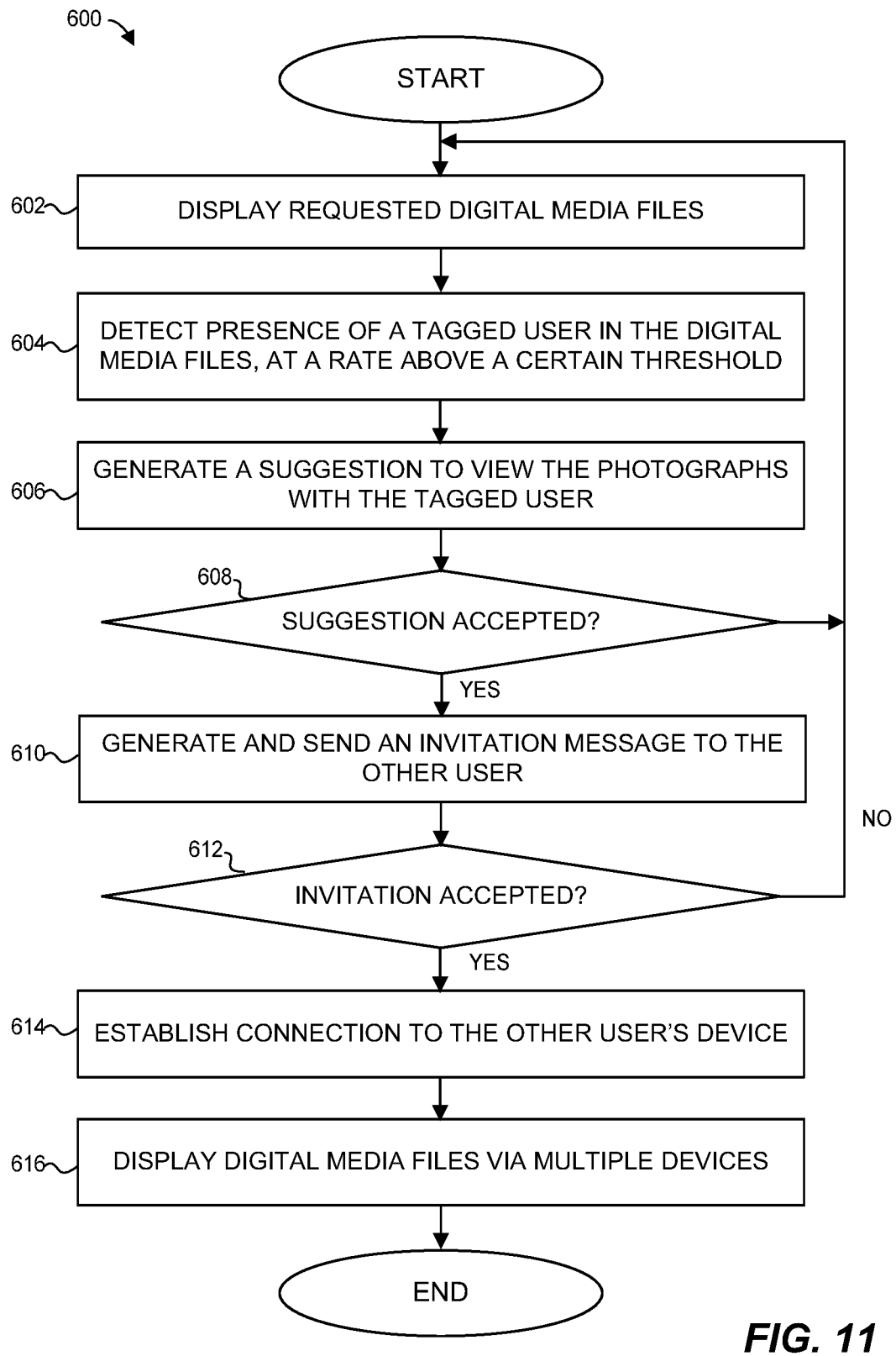
FIG. 11 is a flow diagram of an example method for displaying stored digital media files to multiple users at the same time ("tandem viewing"), which can be implemented in the personal cloud device of FIG. 2.

FIG. 11 is a flow diagram of an example method 600 for displaying stored digital media files to multiple users at the same time ("tandem viewing"). The method 600 begins at block 602, where requested digital media files are displayed for a user operating his or her personal cloud device. For example, user Abby can browse through an album that contains family photographs. At block 604, the presence of a tagged user, Emily, is detected. The personal cloud device 102 can generate a suggestion to view of the photographs together with Emily at block 606.

Although it is possible for the personal cloud device 102 to detect the presence of another tagged user based on a single photograph, a certain low limit of photographs with another user can be imposed to avoid false positives in identifying the browsing trend. For example, the personal cloud device 102 can require that at least N photograph be viewed within a certain time window, and that at least M photographs of these photographs contain the other tagged user before transitioning to block 606. The values of N and M can be 10 and 8, respectively, in an example implementation.

At block 608, it is determined whether the user accepted the suggestion to invite the other tagged user to a tandem viewing session. If the user accepted the suggestion, the flow proceeds to block 610, where an invitation to a tandem viewing session is generated and transmitted to the tagged user. The flow otherwise returns to block 602. If it is determined at block 612 that the tagged user accepted the invitation, the flow proceeds to block 614. Otherwise, the flow returns to block 602.

The personal cloud device 102 can establish a secure connection to the tagged user's device at block 614. The digital media files can be displayed via multiple devices at block 616. For example, referring back to FIG. 1, two users can participate in a tandem viewing session using respective instances of the application 60. In addition to supporting tandem viewing functionality (e.g., by allowing either user to navigate the album, exporting still photographs and/or video to both devices), the application 60 can allow the participants to chat during the session. In other implementations, the personal cloud device 102 can stream content to another device via a web browser window.

ADDITIONAL CONSIDERATIONS

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

Some implementations may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for creating and presenting insurance bundles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the above text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

What is claimed is:

1. A personal cloud device comprising:
   a housing;
   one or more processors disposed within the housing;
   a local area network interface to communicatively couple the one or more processors to a local area network;
   at least one of: (i) internal persistent storage disposed within the housing, or (ii) an interface to removably attach the personal cloud device to a persistent storage device, to store a library of digital media files including photo and/or video content; and
   a memory disposed within the housing and storing thereon:
   identifiers of one or more users authorized to operate the personal cloud device, and
   instructions that, when executed by the one or more processors, cause the personal cloud device to:
      detect a trigger condition related to a location of a user device associated with one of the users, and, in response to detecting the trigger condition, automatically retrieve digital media files from the user device for storage in the internal persistent storage or the persistent storage device,
      analyze at least a portion of the stored library to determine, for a digital media file, attributes including at least one of (i) location where the photo or video content was captured, (ii) a time when the photo or video content was captured, (iii) identity of one or more people depicted in the photo or video content, (iv) identity of a person who captured the photo or video content,
      assign tags to the digital media files in accordance with the determined attributes,
      retrieve one or more user-specified sharing rules from the memory, each rule specifying one or more tags, one or more sharing mechanisms to be used when a digital media file matches the one or more specified tags, and one or more people or devices with which the digital media file is to be shared,
      test at least a portion of the library against the one or more sharing rules, and
      share digital media files in accordance with the sharing rules.

2. The personal cloud device of claim 1 comprising the interface with a first port and a second port to removably attach the personal cloud device to a first persistent storage device and a second persistent storage device, respectively; and wherein the instructions cause the personal cloud device to back up content stored on the first persistent storage device in the second persistent storage device.

3. The personal cloud device of claim 2, wherein the instructions cause the personal cloud device to back up the content in accordance with a rule specified by an authorized user, wherein the rule is stored in the memory.

4. The personal cloud device of claim 2, wherein the instructions cause the personal cloud device to:
   log user interactions with the personal cloud device in the memory, using the logged interactions, generate an estimate of how often the personal cloud device requires access to the second persistent storage device, and supply power to the second persistent storage device in view of the generated estimate.

5. The personal cloud device of claim 2 including no internal persistent storage.

6. The personal cloud device of claim 1, further comprising:

a memory card interface for receiving memory cards compatible with a digital camera, wherein in response to the memory card interface detecting insertion of a memory card, the instructions further cause the personal cloud device to:

retrieve a unique identifier from the inserted memory card, determine whether the unique identifier corresponds to a user authorized to operate the personal cloud device, and automatically retrieve digital media files from the inserted memory card.

7. The personal cloud device of claim 6, wherein the instructions further cause the personal cloud device to transfer the digital media files from the inserted memory card to a folder specific to the user.

8. The personal cloud device of claim 1 communicatively coupled to a wide-area network via the local-area network interface, wherein the instructions further cause the personal cloud device to:

access a remotely disposed peer personal cloud device, via the wide-area network, and automatically synchronize the library of digital media files with the peer personal cloud device, in accordance with a rule stored in the memory.

9. The personal cloud device of claim 1, wherein the trigger condition corresponds to the device associated with one of the users entering a geo-fence of the personal cloud device or joining the local area network.

10. The personal cloud device of claim 1, wherein in response to detecting the trigger condition, the instructions further cause the automatically retrieved digital media files to be removed from the device associated with one of the users.

11. The personal cloud device of claim 1, wherein sharing a digital media files in accordance with the sharing rules includes one of (i) emailing the digital media file, (ii) automatically transferring the digital file to a remotely disposed peer personal cloud device, or (iii) generating a link for accessing the digital media file from a remote device.

12. A method for storing and managing digital media content, the method comprising:

detecting, by a personal cloud device, a trigger condition for automatically retrieving digital media files from a user device operated by an authorized user, the trigger condition related to a location of the user device;

receiving, via a first interface of the personal cloud device, one or more digital media files from a user device, the digital media files including photo and/or video content, in response to detecting the trigger condition;

determining, by the personal cloud device, that a storage device is removably attached to the personal cloud device;

transferring, by the personal cloud device, the received one or more digital media files to the attached storage device, without receiving a user command to initiate the transfer determining, by the personal cloud device, that a secondary storage device is removably attached to the personal cloud device;

automatically backing up content stored on the primary storage device to the secondary storage device;

analyzing the retrieved media files to determine respective attributes including at least one of (i) location where the photo or video content was captured, (ii) a time when the photo or video content was captured, (iii) identity of one or more people depicted in the photo or video content, (iv) identity of a person who captured the photo or video content;

assigning tags to the digital media files in accordance with the determined attributes;

retrieving one or more user-specified sharing rules from a memory of the personal cloud device, each rule specifying one or more tags, one or more sharing mechanisms to be used when a digital media file matches the one or more specified tags, and one or more people or devices with which the digital media file is to be shared;

testing at least a portion of the library against the one or more sharing rules; and sharing digital media files in accordance with the sharing rules.

13. The method of claim 12, further comprising causing the received one or more digital media files to be removed from the user device.

14. The method of claim 12, wherein detecting the trigger condition includes determining that the user device operated by the authorized user is within a geo-fence of the personal cloud device.

15. The method of claim 12, wherein automatically backing up the content includes retrieving, from a memory of the personal cloud device, a rule specified by the authorized user.

* * * * *